US010604356B2

(12) United States Patent
Tanimoto et al.

(10) Patent No.: US 10,604,356 B2
(45) Date of Patent: Mar. 31, 2020

(54) ARTICLE CONVEYING DEVICE (71) Applicant: SHIBUYA CORPORATION, Kanazawa-shi, Ishikawa (JP)

(72) Inventors: Kazuhito Tanimoto, Kanazawa (JP); Tetsuya Nishimura, Kanazawa (JP)

(73) Assignee: Shibuya Corporation, Kanazawa-shi, Ishikawa (JP)

( * ) Notice: Subject to any disclaimer, the term of this patent is extended or adjusted under 35 U.S.C. 154(b) by 0 days.

(21) Appl. No.: 16/367,965

(22) Filed: Mar. 28, 2019

(65) Prior Publication Data
US 2019/0300293 A1    Oct. 3, 2019

(30) Foreign Application Priority Data

Mar. 30, 2018   (JP) ................. 2018-068788

(51) Int. Cl.
| | | |
|---|---|---|
| *B65G 47/49* | (2006.01) | |
| *B65G 47/42* | (2006.01) | |
| *B65G 47/84* | (2006.01) | |
| *B65G 47/64* | (2006.01) | |
| *B65G 23/32* | (2006.01) | |
| *B65G 13/06* | (2006.01) | |
| *B65G 41/00* | (2006.01) | |
| *B65G 23/23* | (2006.01) | |

(52) U.S. Cl.
CPC .......... *B65G 47/496* (2013.01); *B65G 13/06* (2013.01); *B65G 23/23* (2013.01); *B65G 23/32* (2013.01); *B65G 41/003* (2013.01); *B65G 47/42* (2013.01); *B65G 47/642* (2013.01); *B65G 47/643* (2013.01); *B65G 47/843* (2013.01)

(58) Field of Classification Search
CPC .... B65G 47/496; B65G 23/32; B65G 47/843; B65G 47/643; B65G 47/42; B65G 13/12; B65G 41/003; B65G 47/641; B65G 47/642; B65G 13/06
USPC ......................................... 198/619
See application file for complete search history.

(56) References Cited

U.S. PATENT DOCUMENTS

| | | | | |
|---|---|---|---|---|
| 5,899,320 A | * | 5/1999 | Miyasaka ............ | B65G 13/04 198/789 |
| 9,688,473 B2 | * | 6/2017 | Reed .................... | B65G 13/073 |
| 2004/0104101 A1 | * | 6/2004 | Brixius ................ | B65G 47/57 198/575 |

(Continued)

FOREIGN PATENT DOCUMENTS

| | | | | |
|---|---|---|---|---|
| EP | 1870487 A1 | * 12/2007 | ........... | C23C 14/564 |
| JP | 2016-144537 A | 8/2016 | | |
| WO | WO-2017191257 A1 | * 11/2017 | ............. | B65G 23/00 |

*Primary Examiner* — Mark A Deuble
(74) *Attorney, Agent, or Firm* — Flynn Thiel, P.C.

(57) ABSTRACT

An article conveying device 4 includes a movable conveyer 12 for conveying a culture vessel 3 (article) and longitudinal mover 13*b* for moving the movable conveyer 21, and a conveyer driving motor 14 is provided separately from the movable conveyer 12, and a driving magnet MA rotated by a driving shaft 32 driven by the conveyer driving motor 14 and a driven magnet MB provided on the movable conveyer 12 and connected to the driving magnet MA by a magnetic force in a non-contact manner are provided. A plurality of the driven magnets MB is provided along a moving direction of the movable conveyer 12 by the longitudinal mover 13*b*, and an interval between the plurality of the driven magnets MB is matched with a moving distance of the movable conveyer 12 by the longitudinal mover 13*b*.

3 Claims, 9 Drawing Sheets

(56) References Cited

U.S. PATENT DOCUMENTS

| | | | | |
|---|---|---|---|---|
| 2012/0006648 A1* | 1/2012 | Obst | ............... | B65G 13/02 |
| | | | | 198/339.1 |
| 2014/0305773 A1* | 10/2014 | Agnoff | ............... | B65G 23/26 |
| | | | | 198/788 |
| 2018/0208414 A1* | 7/2018 | Gu | ............... | B65G 54/02 |
| 2018/0327009 A1* | 11/2018 | Takagawa | ............... | B65G 13/12 |
| 2019/0055093 A1* | 2/2019 | Chi | ............... | B65G 47/643 |

* cited by examiner

ARTICLE CONVEYING DEVICE

BACKGROUND OF THE INVENTION

Field of the Invention

The present invention relates to an article conveying device and more specifically to an article conveying device in which a conveyer is provided movably by moving means.

Description of the Related Art

Conventionally, an article conveying device including a conveyer for conveying an article and moving means for moving the conveyer is known, and the one which elevates the conveyer up/down by an elevating device or reciprocates it in a conveying direction by a translating device is known, for example (Japanese Patent Laid-Open No. 2016-144537).

In the article conveying device in this Japanese Patent Laid-Open No. 2016-144537, a motor is provided as driving means for driving the conveyer, and since the motor is provided integrally with the conveyer, it is moved with the conveyer by the elevating device and the translating device.

SUMMARY OF THE INVENTION

As in Japanese Patent Laid-Open No. 2016-144537, in the case of a configuration in which the conveyer is moved integrally with the motor, wiring such as a power cable connected to the motor alternates an extended state and a bent state at each movement of the conveyer, which incurs a problem that deterioration or disconnection can occur easily.

Moreover, there is another problem that the wiring needs to be laid with sagging for allowing movement of the conveyer and a space for the wiring to move needs to be ensured around the conveyer.

In view of these problems, the present invention provides an article conveying device which can drive a conveyer provided movably by driving means which is provided as a separate body.

That is, an article conveying device described in claim 1 is an article conveying device including a conveyer for conveying an article and moving means for moving the conveyer, characterized in that:

driving means for driving the conveyer is provided separately from the conveyer, and a driving shaft rotated/driven by the driving means, a driving magnet rotated by a driving force of the driving shaft, a driven magnet provided on the conveyer and to which rotation is transmitted by a magnetic force in a non-contact manner from the driving magnet, and an input shaft rotated together with the driven magnet and driving the conveyer are included; and a plurality of the driven magnets is provided along a moving direction of the conveyer by the moving means, and an interval between the plurality of driven magnets is matched with a moving distance of the conveyer by the moving means.

Moreover, the article conveying device described in claim 2 is an article conveying device including a conveyer for conveying an article and moving means for moving the conveyer, characterized in that:

driving means for driving the conveyer is provided separately from the conveyer, and a driving shaft rotated/driven by the driving means, a driving magnet rotated by a driving force of the driving shaft, a driven magnet provided on the conveyer and to which rotation is transmitted from the driving magnet by a magnetic force in a non-contact manner, and an input shaft rotated together with the driven magnet and driving the conveyer are included; and the driving shaft is provided along a moving direction of the conveyer by the moving means, a plurality of the driving magnets is provided along the driving shaft, and an interval between the plurality of driving magnets is matched with a moving distance of the conveyer by the moving means.

According to the invention in claims 1 and 2, since the driving means is provided separately from the conveyer, and the rotation by the driving means is transmitted from the driving magnet to the driven magnet by the magnetic force in the non-contact manner, the driving means is not moved, the problem of deterioration or disconnection of the wiring connected to the driving means is solved, and ensuring of the space for the wiring is no longer needed.

DETAILED DESCRIPTION OF THE PREFERRED EMBODIMENT

Hereinafter, an illustrated embodiment will be described, and FIGS. 1 to 8 illustrate a sterile culture system 1 for culturing of cells, and inside a sterile chamber 2 having an inside maintained in a sterile state, a work chamber 2A where the cells are seeded in a culture vessel 3 and culture works such as medium exchange, transfer, recovery and the like are performed and a culture chamber 2B where the culture vessel 3 is accommodated and the culture of the cells is performed are formed. As the culture vessel 3 in this embodiment, a multi-layered type culture vessel 3 for large-quantity culture is used.

Inside the work chamber 2A, an article conveying device 4 controlled by control means, not shown, is provided so that the culture vessel 3 as an article to be conveyed is automatically conveyed between the work chamber 2A and the culture chamber 2B.

The work chamber 2A and a culture chamber 2B are formed by being partitioned by a partition wall 5 provided inside the sterile chamber 2. The work chamber 2A is constituted as a clean space and an isolator isolated from an outside atmosphere, and after the inside is decontaminated by supplying hydrogen peroxide steam from decontaminating means, not shown, it is maintained in a sterile environment with a pressure more positive than the outside, and cleanliness is maintained by ventilation by a one-way flow by sterile air from above to below by sterile air supply means, not shown.

Moreover, an instrument or a robot required for the culture work is provided in the work chamber 2A, and the culture work can be performed automatically.

The culture chamber 2B is constituted as an incubator, and the inside thereof is maintained in the sterile environment and is maintained at a predetermined temperature and humidity suitable for culture of the cells.

Note that the culture work with the robot or the like in the sterile state using the isolator and the work itself of the culture of the cells by using the incubator are well-known and thus, further detailed description will be omitted.

Figure 4:
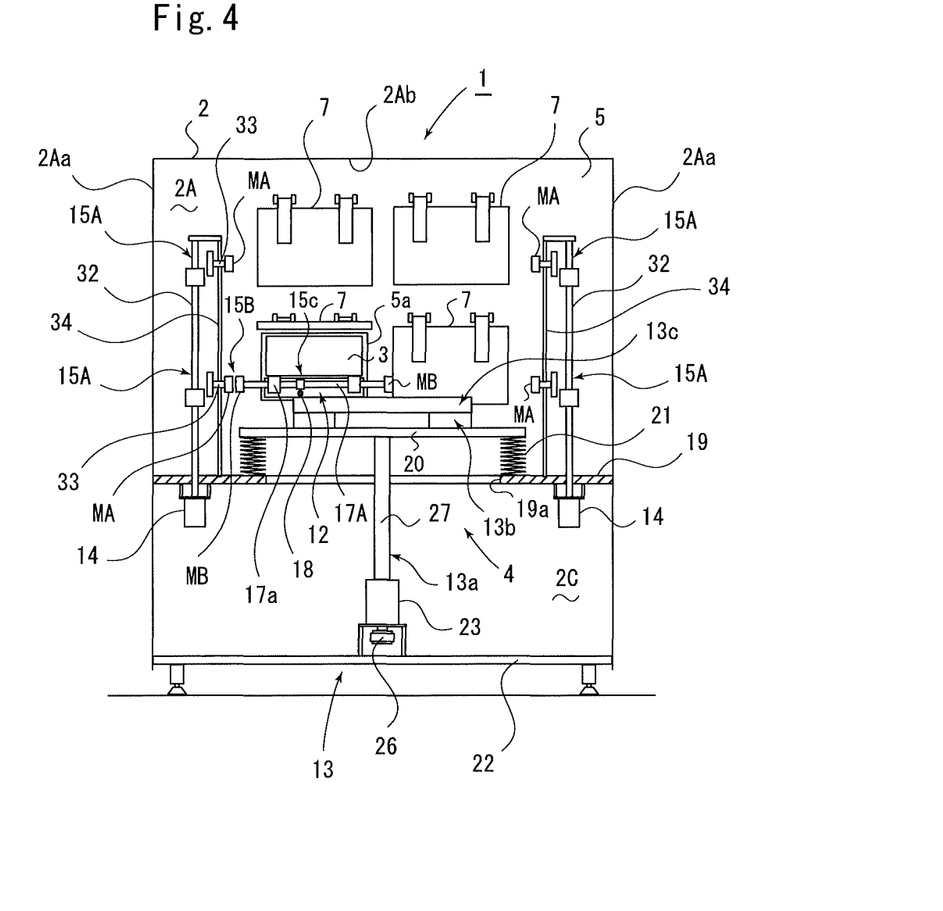
FIG. 4 is a side sectional view of the article conveying device and a view illustrating a state where the conveyer is positioned at a lower-stage position and a serial position.

As illustrated in FIG. 4, opening portions 5a allowing the work chamber 2A and the culture chamber 2B to communicate with each other are formed in two rows in a horizontal direction and two stages vertically, that is, four opening portions 5a in total, a placing conveyer 6 for placing the culture vessel 3 is provided inside on the culture chamber 2B side at each of the opening portions 5a, and an opening/closing door 7 is provided on the work chamber 2A side.

The placing conveyer 6 is constituted by a plurality of rollers, and the culture of the cells is performed in the culture chamber 2B in a state where the culture vessel 3 is placed on the placing conveyer 6.

Moreover, a pusher, not shown, is provided on the placing conveyer 6, and by reciprocating along the placing conveyer 6, the culture vessel 3 placed on the placing conveyer 6 is pushed out of the opening portion 5a toward the work chamber 2A.

The opening/closing door 7 is automatically opened/closed by driving means, not shown, and when all the four opening/closing doors 7 are closed, the work chamber 2A and the culture chamber 2B are separated in a state where air tightness is kept.

In the sterile chamber 2, a work conveyer 11 extended from a work position, not shown, and transferring the culture vessel 3, a movable conveyer 12 as conveying means for conveying the culture vessel 3 between the work conveyer 11 and the placing conveyer 6 in the culture chamber 2B, and moving means 13 for moving the movable conveyer 12 are provided.

The moving means 13 is capable of moving the movable conveyer 12 in a vertical direction (the vertical direction in FIGS. 1 to 5), in a longitudinal direction in the conveying direction of the movable conveyer 12 (the horizontal direction in FIGS. 1 to 3 and FIGS. 6 to 8, in the longitudinal direction to a drawing surface in FIGS. 4 and 5), and in a direction orthogonal to the conveying direction of the movable conveyer 12 (the longitudinal direction to the drawing surface in FIGS. 1 to 3, the horizontal direction in FIGS. 4 and 5, and the vertical direction in FIGS. 6 to 8), respectively.

As a result, the moving means 13 is capable of bringing/separating the movable conveyer 12 on which the culture vessel 3 is placed to/from the placing conveyer 6 provided in the culture chamber 2B through the four opening portions 5a.

Note that, in this embodiment, the conveying direction in which the culture vessel 3 is carried into the culture chamber 2B is assumed to be a forward rotation direction of the movable conveyer 12 and the conveying direction of carrying out to be a backward rotation direction.

And the movable conveyer 12 in this embodiment is configured to be driven by a conveyer driving motor 14 (shown in FIGS. 4 and 5) as driving means provided outside the work chamber 2A thorough transmitting means 15.

Figure 6:
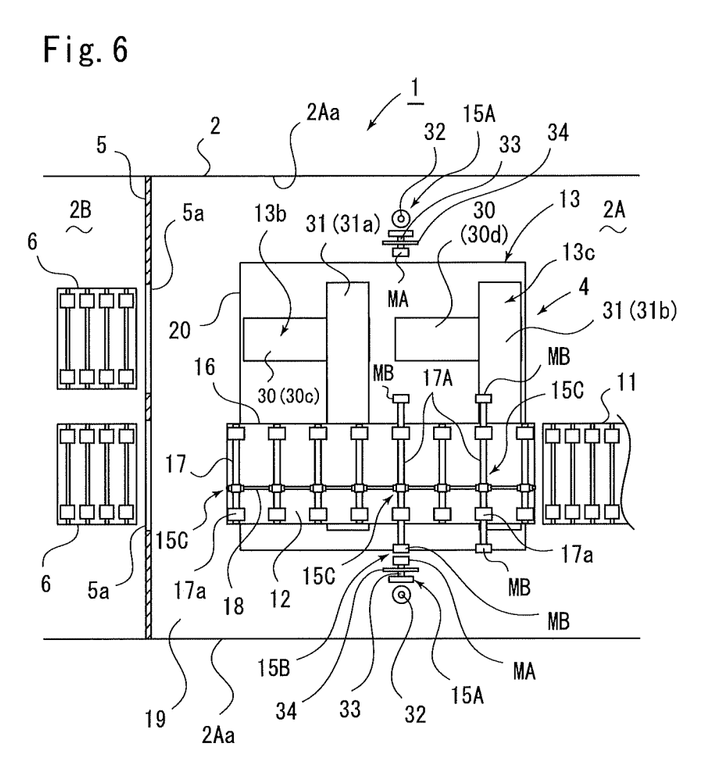
FIG. 6 is a plan view of the article conveying device and a view illustrating a state where the conveyer is positioned at the standby position and the serial position.
Figure 7:
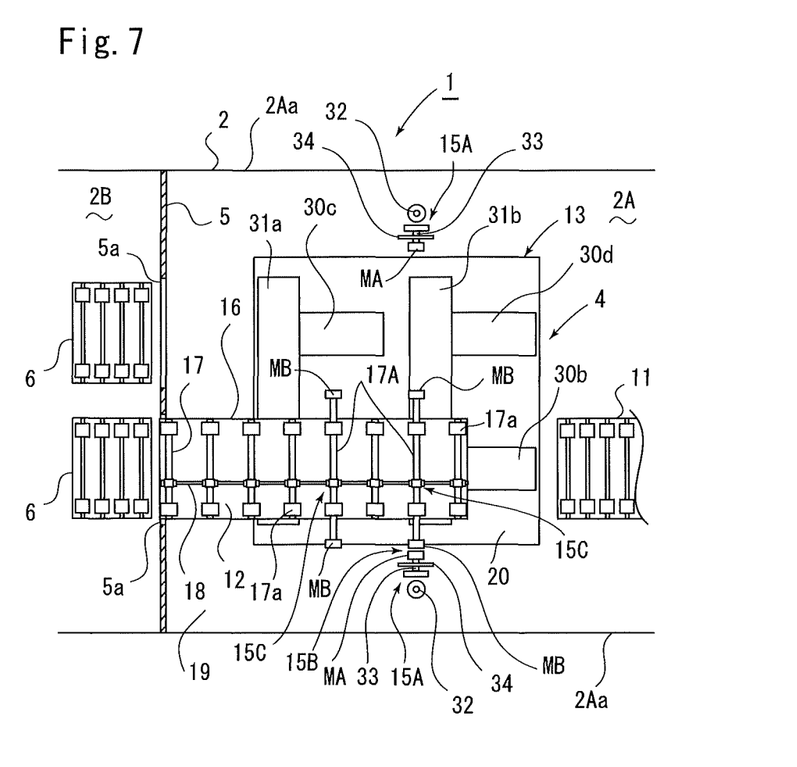
FIG. 7 is a plan view of the article conveying device and a view illustrating a state where the conveyer is positioned at the carrying-in/out position and the serial position.
Figure 8:
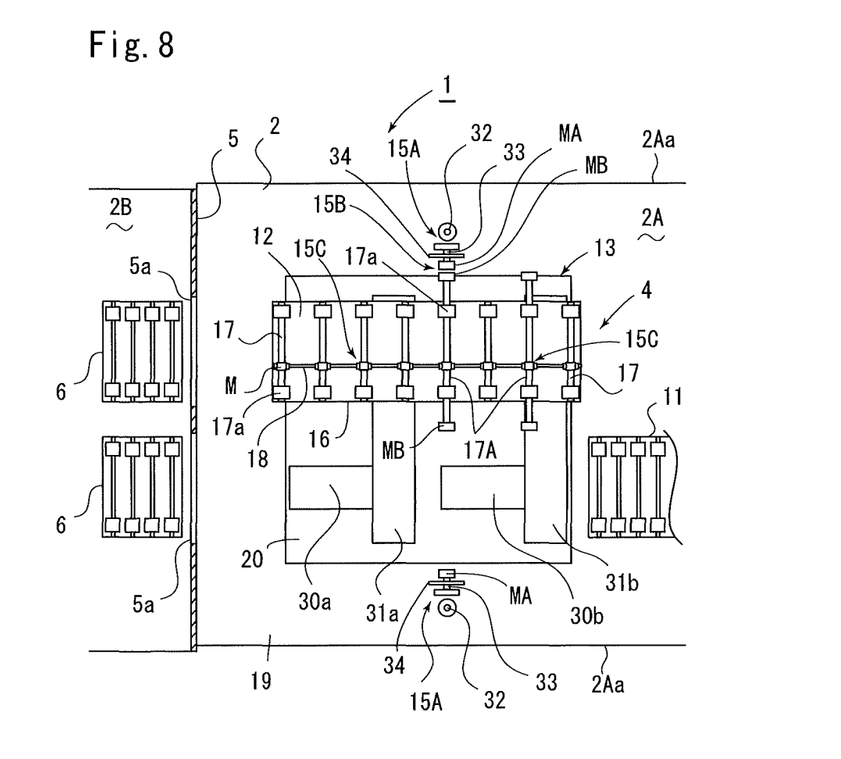
FIG. 8 is a plan view of the article conveying device and a view illustrating a state where the conveyer is positioned at the standby position and the biased position.

The movable conveyer 12 is made of a roller conveyer and is constituted by a frame 16 provided in parallel, eight rotation shafts 17 provided between the frame 16, and a roller 17a provided on each of the rotation shafts 17 as illustrated in FIGS. 6 to 8.

Among the aforementioned eight rotation shafts 17, two rotation shafts 17 separated from each other at a predetermined interval are input shafts 17A to which the rotation of the conveyer driving motor 14 is transmitted, and more specifically, the second and fourth rotation shafts 17 from the right in FIG. 6 correspond to the input shafts 17A.

Moreover, below each of the rotation shafts 17, a transmitting shaft 18 is provided orthogonally to the rotation shaft 17 is provided, and rotation of the input shaft 17A to which the rotation is transmitted, which will be described later in detail, is transmitted to the driven rotation shaft 17 other than the input shafts 17A so that rotating force is given to all the rotation shafts 17.

Note that, in this embodiment, the movable conveyer 12 is described as the roller conveyer, but a conveyer in a form such as a belt conveyer can be also employed, and in this case, the rotation of the input shaft 17A is transmitted to another driven rotation shaft 17 by a belt or the like for rotation.

The moving means 13 for moving the movable conveyer 12 has elevating means 13a for elevating the movable conveyer 12 up/down, longitudinal moving means 13b for moving the movable conveyer 12 to front and rear in the conveying direction, and orthogonal moving means 13c for moving the movable conveyer 12 in a direction orthogonal to the conveying direction.

Describing the elevating means 13a, as illustrated in FIGS. 1 to 5, an opening portion 19a is formed in a floor plate 19 of the work chamber 2A, and an elevating table 20 supporting the movable conveyer 12 is provided so as to cover this opening portion 19a.

Note that a work space constituting the work chamber 2A is formed by being surrounded by separating members such as the partition wall 5, a side wall 2Aa, the floor plate 19, a ceiling 2Ab and the like forming the other wall surfaces.

A bellows 21 having flexibility is provided between the opening portion 19a and the elevating table 20, and elevation of the elevating table 20, that is, movement in the vertical direction is allowed by separating an internal space of the work chamber 2A from a driving chamber 2C outside by the bellows 21 in a state where air tightness is kept.

A support portion 22 of the driving mechanism is provided in the driving chamber 2C below the floor plate 19 of the work chamber 2A, and an elevating motor 23 and a screw shaft 25 pivotally supported by a stator 24 in a vertical direction are provided as the elevating means 13a in the support portion 22, and a belt 26 is extended between the elevating motor 23 and the screw shaft 25 so that the screw shaft 25 is rotated forward/backward by the elevating motor 23.

A ball nut 28 is screwed with the screw shaft 25, the elevating table 20 is supported by this ball nut 28 through a connecting member 27, and as the ball nut 28 is elevated up/down along the screw shaft 25 with forward/backward rotation of the screw shaft 25, the elevating table 20 is elevated up/down, and the movable conveyer 12 is moved vertically.

Moreover, the elevating table 20 includes a guide means 29 for guiding the vertical movement while maintaining the horizontal, and this guide means 29 is provided between a guide member 29A suspended and provided on a lower surface of the elevating table 20 and the floor plate 19 as well as the support portion 22 and is constituted by a guide rod 29B for guiding the guide member 29A vertically.

Figure 1:
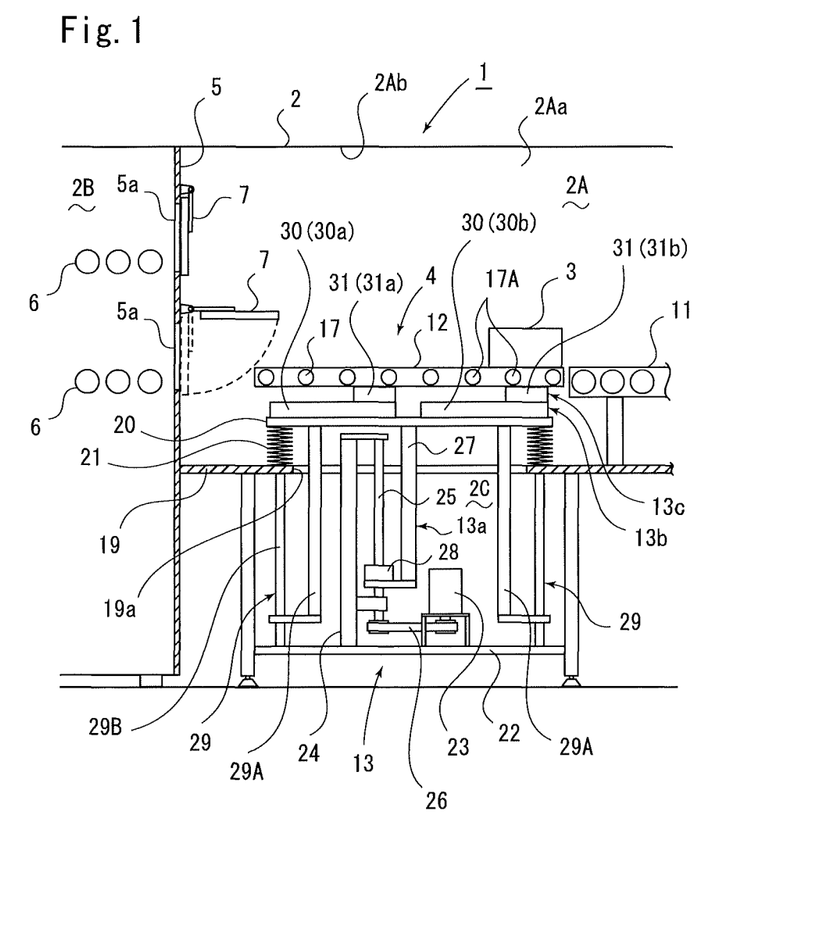
FIG. 1 is a front sectional view of an article conveying device according to this embodiment and a view illustrating a state where the conveyer is positioned at a lower-stage position and a standby position.
Figure 2:
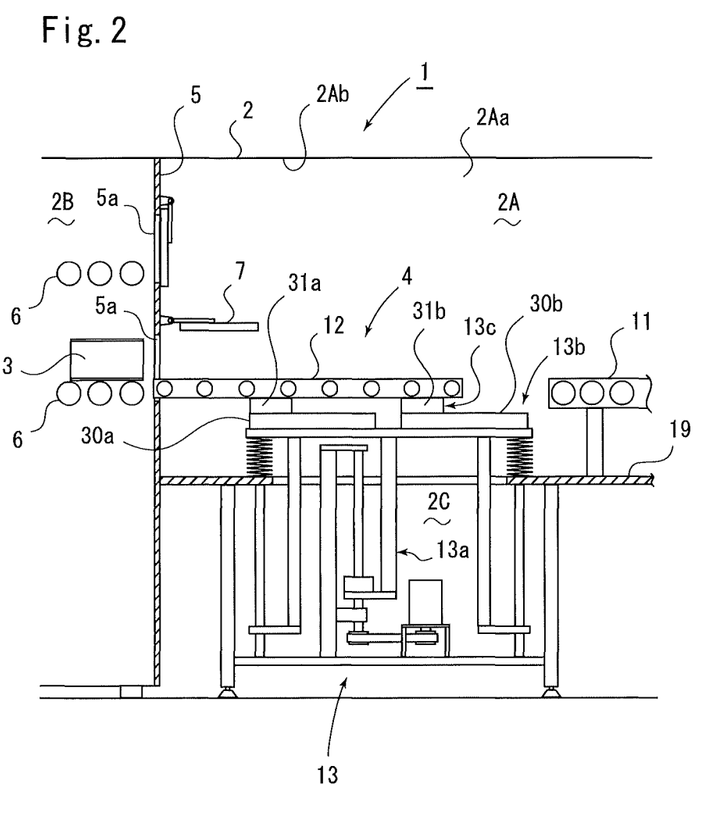
FIG. 2 is a front sectional view of the article conveying device and a view illustrating a state where the conveyer is positioned at the lower-stage position and carrying in/out position.

By means of the configuration as above, the elevating means 13a positions the movable conveyer 12 at a lower-stage position and an upper-stage position, and a conveying height of the movable conveyer 12 at the lower-stage position as illustrated in FIG. 1 is matched with the conveying height of the work conveyer 11 and is matched with the conveying height of the placing conveyer 6 provided correspondingly to the opening portion 5a on the lower stage of the culture chamber 2B as illustrated in FIG. 2.

Figure 3:
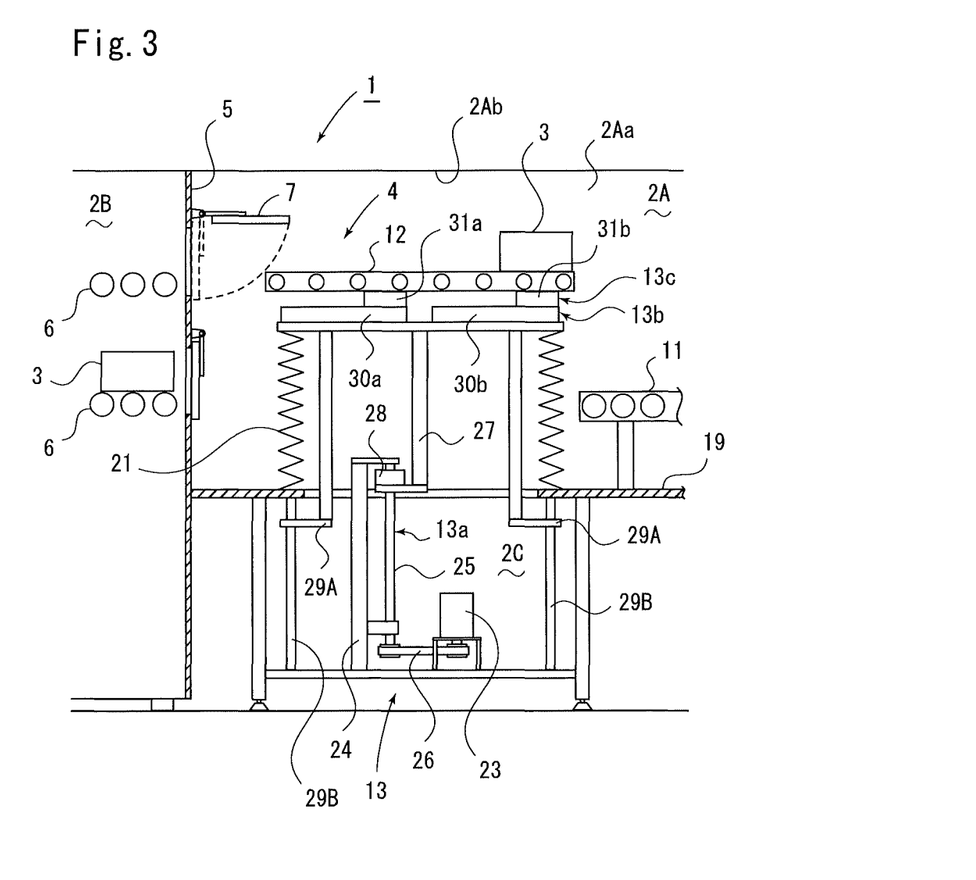
FIG. 3 is a front sectional view of the article conveying device and a view illustrating a state where the conveyer is positioned at an upper-stage position and a standby position.

On the other hand, the conveying height of the movable conveyer 12 at the upper-stage position as illustrated in FIG. 3 is matched with the conveying height of the placing conveyer 6 provided corresponding to the opening portion 5a on the upper stage of the culture chamber 2B.

The longitudinal moving means 13b is constituted by four linear sliders 30 provided on an upper surface of the elevating table 20 and is constituted by two vertical sliders 30a and 30b provided on front and rear in the conveying direction of the movable conveyer 12 and two vertical sliders 30c and 30d provided in parallel with them. The movable conveyer 12 is configured to reciprocate to the front and rear in the conveying direction of the movable conveyer 12 by them.

The movable conveyer 12 is configured to be positioned at a standby position and a carrying-in/out position by the longitudinal moving means 13b, and in a state where the movable conveyer 12 is positioned at the standby position at the lower-stage position as illustrated in FIG. 1, the movable conveyer 12 is brought close to the work conveyer 11 so that the culture vessel 3 can be delivered to the work conveyer 11.

At this time, an end portion on the culture chamber 2B side in the movable conveyer 12 is set at a position which does not prevent an opening/closing operation of the opening/closing door 7 provided at the opening portion 5a, and when the movable conveyer 12 is moved from the standby position to the carrying-in/out position, the opening/closing door 7 of the opening portion 5a which is a target is opened in advance.

On the other hand, when the movable conveyer 12 is positioned at the carrying-in/out position as illustrated in FIG. 2, the movable conveyer 12 is brought close to the placing conveyer 6 in the culture chamber 2B so as to carry the culture vessel 3 into the culture chamber 2B and to carry it out of the culture chamber 2B.

And the interval between the two input shafts 17A provided on the movable conveyer 12 is set in accordance with the moving distance of the movable conveyer 12 between the standby position and the carrying-in/out position.

The orthogonal moving means 13c is constituted by two linear sliders 31 and is constituted by two lateral sliders 31a and 31b provided in a direction orthogonal to the conveying direction on front and rear of the movable conveyer 12 in the conveying direction.

Moreover, the lateral slider 31a is provided on the vertical sliders 30a and 30c, and the lateral slider 31b is provided on the vertical sliders 30b and 30d so that they are moved to front and rear of the movable conveyer 12 in the conveying direction, respectively.

The orthogonal moving means 13c can move the movable conveyer 12 to the direction orthogonal to the conveying direction by these front and rear lateral sliders 31a and 31b and positions the movable conveyer 12 at a serial position and a biased position.

At the serial position illustrated in FIG. 6, the movable conveyer 12 is aligned in series with the work conveyer 11 and in FIG. 7, the movable conveyer 12 is aligned in series with the placing conveyer 6 provided on the opening portion 5a on the left in FIG. 4.

On the other hand, at the biased position illustrated in FIG. 8, the movable conveyer 12 is biased with respect to the work conveyer 11 and is aligned in series with the placing conveyer 6 provided on the opening portion 5a of the culture chamber 2B illustrated on the right in FIG. 4.

The conveyer driving motor 14 for driving the movable conveyer 12 and the transmitting means 15 will be described, and as illustrated in FIG. 4, the conveyer driving motor 14 is fixed to the lower surface of the floor plate 19 of the work chamber 2A and is provided in the driving chamber 2C outside of the clean space inside the work chamber 2A.

Therefore, wiring and the like for supplying electricity to the conveyer driving motor 14 are also disposed outside the work chamber 2A.

As illustrated in FIGS. 4 to 8, the conveyer driving motor 14 is provided on both sides of the elevating table 20 with the conveying direction of the movable conveyer 12 as the longitudinal direction and is provided on the both sides of a movement width of the movable conveyer 12 moving between the serial position and the biased position, and when the movable conveyer 12 is positioned at the serial position or the biased position, it is driven by separate conveyer driving motors 14, respectively.

And the transmitting means 15 includes a driving shaft 32 rotated/driven by the conveyer driving motor 14 and an axis intersecting means 15A and a shaft-coupling means 15B, provided between the driving shaft 32 and the movable conveyer 12, as non-contact type driving/transmitting means for transmitting driving of the driving shaft 32 to the movable conveyer 21 in the non-contact manner.

Moreover, as the transmitting means 15, an axis non-intersecting means 15C is provided as the non-contact type driving/transmitting means for transmitting the rotation in the non-contact manner between the input shaft 17A as well as the other rotation shafts 17 and the transmission shaft 18 in the movable conveyer 12.

The driving shaft 32 is provided so as to penetrate the floor plate 19 of the work chamber 2A and its lower end portion is connected to the conveyer driving motor 14, while a portion protruding into the internal space of the work chamber 2A is rotatably supported through a bearing by a columnar portion 34 installed upright in a perpendicular direction in the work chamber 2A, and a penetrating portion of the floor plate 19 is sealed so as to allow rotation.

The axis intersecting means 15A is pivotally supported so that a driven shaft 33 is directed to the horizontal through a bearing portion provided in the vicinity of a center part and in the vicinity of an upper end portion of the columnar portion 34, and a distal end of the driven shaft 33 is provided so as to protrude to the movable conveyer 12 side from the columnar portion 34.

As illustrated in FIGS. 6 and 7, the position in the horizontal direction where the axis intersecting means 15A is provided is such a position that is adjacent to the two input shafts 17A of the movable conveyer 12 when the movable conveyer 12 is positioned by the longitudinal moving means 13b at the standby position and the carrying-in/out position.

Figure 5:
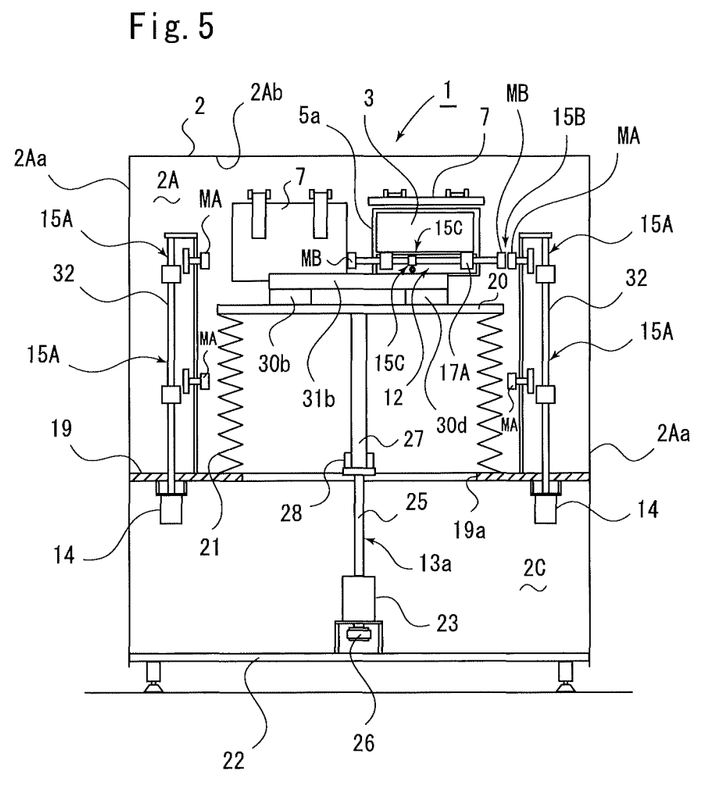
FIG. 5 is a side sectional view of the article conveying device and a view illustrating a state where the conveyer is positioned at the upper-stage position and a biased position.

Moreover, as illustrated in FIGS. 4 and 5, the height where the axis intersecting means 15A is provided is such a height that is adjacent to the input shaft 17A of the movable conveyer 12 when the movable conveyer 12 is positioned by the elevating means 13a at the upper-stage position and the lower-stage position.

Figure 9:
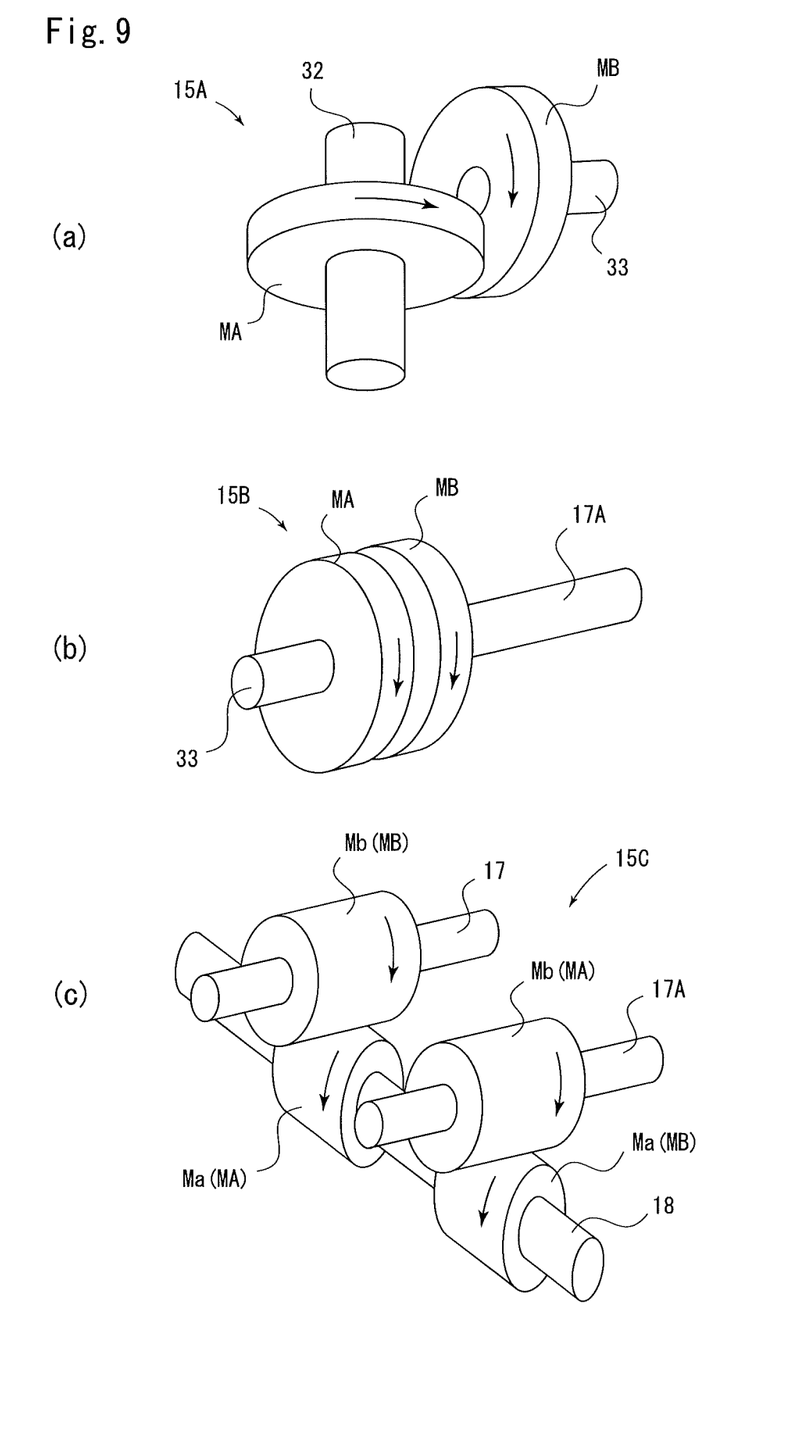
FIG. 9 is a view for explaining various types of transmitting means used in this embodiment.

And FIG. 9(a) is a view for explaining configuration of the axis intersecting means 15A as the non-contact type driving/transmitting means.

On the driving shaft 32, a disk-shaped driving magnet MA is provided in conformity to the position of the driven shaft 33, and a disk-shaped driven magnet MB is provided on a rear end portion of the driven shaft 33.

Since the driving shaft 32 and the driven shaft 33 are provided so that their shaft cores are orthogonal to each other, a center axis of the driving magnet MA and a center axis of the driven magnet MB are also orthogonal to each other, and an outer peripheral surface of the driven magnet MB is provided close to a surface of the driven magnet MB.

The driving magnet MA and the driven magnet MB have configuration in which an S-pole and an N-pole are provided alternately at a predetermined interval along circumferential directions, respectively, and thus, the S-pole and the N-pole are connected in a non-contact manner by a magnetic force at a position where the driving magnet MA and the driven magnet MB are close to each other.

With such configuration, when the driving shaft 32 is rotated, the driving magnet MA is rotated, and since magnetic poles of the driving magnet MA is alternately switched between the S-pole and the N-pole at the position where the driving magnet MA and the driven magnet MB are close to each other, the magnetic poles of the driven magnet MB follow that, and as a result, the driven shaft 33 is rotated and is made to function as the driving/transmitting means.

Subsequently, the rotation of the driven shaft 33 in the axis intersecting means 15A is transmitted to the input shaft 17A of the movable conveyer 12 through the shaft-coupling means 15B as the non-contact type driving/transmitting means.

FIG. 9(b) is a view for explaining the configuration of the shaft-coupling type 15B, and the disk-shaped driving magnet MA is provided at the distal end of the driven shaft 33.

On the other hand, as illustrated in FIG. 4, both end portions of the input shaft 17A are protruded to the sides from the frame 16 of the movable conveyer 12, and the disk-shaped driven magnet MB is provided at a distal end of the protruding portion.

Then, when the movable conveyer 12 is moved by the moving means 13, and the input shaft 17A of the movable conveyer 12 becomes adjacent to the driven shaft 33, the shaft core of the driven shaft 33 and the shaft core of the input shaft 17A match each other, and the surface of the driving magnet MA of the driven shaft 33 is faced with the surface of the driven magnet MB of the input shaft 17A.

In this configuration, too, the driving magnet MA and the driven magnet MB have the configuration in which the S-pole and the N-pole are alternately provided at the predetermined interval along the circumferential direction, respectively, and thus, the different magnetic poles of the driving magnet MA and the driven magnet MB faced with each other are connected in the non-contact manner by the magnetic force and configured to function as the driving/transmitting means.

Therefore, when the driving magnet MA of the driven shaft 33 is rotated, the driven magnet MB follows it by maintaining a state where the different magnetic poles are attracted to each other with the driving magnet MA, whereby the input shaft 17A is rotated.

Then, the driving magnet MA of the driven shaft 33 is rotated by the driving force of the conveyer driving motor 14 and thus, the driving force of the driving shaft 32 is transmitted to the input shaft 17A of the movable conveyer 12 by the magnetic force in the non-contact manner.

The rotation of the input shaft 17A is transmitted to the other rotation shafts 17 through a transmission shaft 18 in which a plurality of the non-intersecting axis types 15C as the non-contact type driving/transmitting means is disposed.

FIG. 9(c) is a view for explaining the configuration of the non-intersecting axis type 15C, and a cylindrical magnet Ma is provided on the transmission shaft 18 in the movable conveyer 12 in accordance with the interval between the crossing rotation shafts 17.

On the other hand, a cylindrical magnet Mb is provided also on all the rotation shafts 17 including the input shaft 17A, and since each of the rotation shafts 17 and the transmission shaft 18 are orthogonal to each other, the shaft core of the cylindrical magnet Ma and the shaft core of the magnet Mb provided on them are orthogonal to each other.

The S-pole and the N-pole each having a curved shape drawing a spiral along the circumferential direction are alternately provided at the predetermined interval on these magnets Ma and Mb, and these magnets Ma and Mb are provided to be close to each other but with outer peripheral surfaces not in contact with each other.

By means of the configuration as above, when the input shaft 17A is rotated, the magnet Mb provided on the input shaft 17A acts as the driving magnet MA, the different magnetic poles are attracted to each other with the magnet Ma of the transmission shaft 18 adjacent to the magnet Mb, whereby the magnet M of the transmission shaft 18 acts as the driven magnet MB, and the transmission shaft 18 is rotated.

On the other hand, when the transmission shaft 18 is rotated, the other magnets Ma provided on the transmission shaft 18 act as the driving magnet MA, the magnets Mb provided on the rotation shafts 17 other than the input shaft 17A (including the other input shaft 17A to which the driving force is not transmitted) act as the driven magnet MB, and all the rotation shafts 17 are rotated and configured to function as the driving/transmitting means.

As described above, the rotation of the conveyer driving motor 14 is transmitted to the input shaft 17A by the transmitting means 15, and the rotation is transmitted to the other rotation shafts 17 through the transmission shaft 18, and the all the rotation shafts 17 constituting the movable conveyer 12 are rotated, whereby the culture vessel 3 placed on the movable conveyer 12 can be conveyed.

Note that, by switching forward/backward of the rotation direction of the conveyer driving motor 14, the conveying direction can be switched to a direction in which the culture vessel 3 is carried into the culture chamber 2B from the work conveyer 11 and to the direction of carrying it out of the culture chamber 2B to the work conveyer 11.

According to the transmitting means 15 having the configuration above, even if the movable conveyer 12 is moved by the moving means 13, the rotation of the conveyer driving motor 14 can be transmitted to the movable conveyer 12 at a destination of the movement.

That is, as illustrated in FIGS. 4 and 5, when the movable conveyer 12 is moved upward or downward by the elevating means 13a, since the plurality of the driving magnets MA is provided along the driving shaft 32, and the interval between the driving magnets MA is made to match the moving distance of the movable conveyer 12 by the elevating means 13a, the movable conveyer 12 can be driven at the upper-stage position and the lower-stage position.

Moreover, as illustrated in FIGS. 6 and 7, when the movable conveyer 12 is moved forward or backward by the longitudinal moving means 13b, since the plurality of input shafts 17A each having the driven magnet MB provided is provided on the movable conveyer 12 and the interval between the input shafts 17A is matched with the moving distance of the movable conveyer 12 by the longitudinal moving means 13b, the movable conveyer 12 can be driven at the standby position and the carrying-in/out position.

Furthermore, as illustrated in FIGS. 6 and 8, when the movable conveyer 12 is moved to the left or to the right by the orthogonal moving means 13c, since the driven magnet MB is provided on the both sides of the input shaft 17A of the movable conveyer 12 and the driving magnet MA rotated by the driving shaft 32 is provided at movement destinations of the movable conveyer 12 moved by the orthogonal moving means 13c, respectively, the movable conveyer 12 can be driven at the serial position and the biased position.

According to the article conveying device 4 having the configuration above, the culture vessel 3 can be carried in/out of the opening portion 5a with respect to the culture chamber 2B in which a plurality of opening portions 5a each including the opening/closing door 7 is formed without interfering with the opening/closing door 7 subjected to the opening/closing operation.

First, as illustrated in FIG. 1, in order that the movable conveyer 12 is to receive the culture vessel 3 from the work conveyer 11, the movable conveyer 12 is positioned at the lower-stage position by the elevating means 13a, positioned at the standby position by the longitudinal moving means 13b, and positioned at the serial position by the orthogonal moving means 13c.

The work conveyer 11 is operated in this state, and the state where the culture vessel 3 is placed on the movable conveyer 12 can be realized as illustrated in FIG. 1 by feeding out the culture vessel 3, and by operating the movable conveyer 12 to the forward rotation direction.

If the culture vessel 3 is to be accommodated in the opening portion 5a lower left in FIG. 4 from this state, as illustrated in FIG. 2, the movable conveyer 12 is moved by the longitudinal moving means 13B from the standby position to the carrying-in/out position, and by operating the movable conveyer 12 to the forward rotation direction, the culture vessel 3 can be carried into the culture chamber 2B.

Subsequently, when the culture vessel 3 is to be carried in from the opening portion 5a lower right in FIG. 4, as illustrated in FIGS. 6 and 7, first, the orthogonal moving means 13c moves the movable conveyer 12 from the serial position to the biased position and then, the longitudinal moving means 13b moves the movable conveyer 12 from the standby position to the carrying-in/out position, whereby the culture vessel 3 can be carried into the culture chamber 2B.

Moreover, when the culture vessel 3 is to be conveyed to the opening portion 5a upper left in FIG. 4, as illustrated in FIG. 3, first, the elevating means 13a moves the movable conveyer 21 from the lower-stage position to the upper-stage position and then, the longitudinal moving means 13b moves the movable conveyer 12 from the standby position to the carrying-in/out position, whereby the culture vessel 3 can be carried into the culture chamber 2B.

Furthermore, when the culture vessel 3 is to be conveyed to the opening portion 5a upper right in FIG. 4, as illustrated in FIG. 5, the elevating means 13a moves the movable conveyer 12 from the lower-stage position to the upper-stage position and the orthogonal moving means 13c moves the movable conveyer 12 from the serial position to the biased position and then, the longitudinal moving means 13b moves the movable conveyer 12 from the standby position to the carrying-in/out position, whereby the culture vessel 3 can be carried into the culture chamber 2B.

The article conveying device 4 according to this embodiment can transmit the driving force of the conveyer driving motor 14 provided separately to the movable conveyer 12 in the non-contact manner by providing the conveyer driving motor 14 in the driving chamber 2C outside of the work chamber 2A and by using the driving magnet MA rotated by the driving shaft 32 as the transmitting means 15 and the driven magnet MB to which the rotation is transmitted from the driving magnet MA by the magnetic force in the non-contact manner.

As a result, since a motor for driving does not have to be provided on the movable conveyer 12, wiring for supplying electricity to the motor does not have to be provided inside the work chamber 2A, deterioration or disconnection of the wiring does not occur as before, and a space for allowing sagging of the wiring does not have to be provided. Moreover, dusts from the motor or leakage of grease do not lower the cleanliness of the work chamber 2A.

Furthermore, since the rotation is transmitted in the non-contact manner by the magnetic force, generation of dusts such as friction powders or the like caused by transmission of the power as in the case of using contact-type gears and clutches can be prevented, and the inside of the space can be maintained with high cleanliness.

In the aforementioned embodiment, one each of the culture vessels 3 can be placed on the placing conveyer 6 of the culture chamber 2B, but it may be so configured that a plurality of the culture vessels 3 can be placed in the conveying direction and the number of opening portions 5a can be increased in the vertical direction as necessary.

Moreover, in the aforementioned embodiment, the movable conveyer 12 can be moved in the horizontal direction by the orthogonal moving means 13c, but it may be so configured that a plurality of the movable conveyers 2 is provided in the orthogonal direction and made to reciprocate only in the vertical direction and in the conveying direction by the elevating means 13 and the conveying direction moving means 13.

In this case, the number of rows of the opening portions 5a of the culture chamber 2B can be increased to three or more by providing three rows or more of the movable conveyers 12, and the culture chamber 2B as an incubator can be enlarged.

Furthermore, the driving shaft 32 is driven by individual conveyer driving motor 14 but may be driven by one conveyer driving motor 14 by providing a gear mechanism or the like on the driving chamber 2C.

Still further, the driving shaft rotated by the conveyer driving motor 14 is provided in the horizontal direction by penetrating a side wall 2Aa as an isolating member constituting the sterile chamber 2 and the driving magnet MA is provided at the distal end of the driving shaft so that the axis intersecting means 15A which is the non-contact type driving/transmitting means can be omitted. In this case, the driving shaft needs to be provided in conformity to the upper-stage position and the lower-stage position of the movable conveyer 12, respectively, but they may be driven by one conveyer driving motor.

Note that the present embodiment is configured such that the article conveying device 4 according to the present invention is provided inside the sterile chamber 2 of the cell culture system 1, but the inside of the space does not have to be sterile but the article conveying device 4 can be installed also in a work chamber where a semiconductor or a precision machine in which generation of dusts has to be avoided is manufactured.

REFERENCE SIGNS LIST 1 sterile culture system
2 sterile chamber
2A work chamber
2B culture chamber
3 culture vessel (article)
4 article conveying device
12 movable conveyer
13 moving means
13a elevating means
13b longitudinal moving means
13c orthogonal moving means
14 conveyer driving motor (driving means)
15 transmitting means
17 rotation shaft
17A input shaft
18 transmission shaft
32 driving shaft
33 driven shaft
MA driving magnet
MB driven magnet

What is claimed is:

1. An article conveying device including a conveyer for conveying an article and moving means for moving the conveyer, characterized in that:

driving means for driving the conveyer is provided separately from the conveyer, and a driving shaft rotated by the driving means, a driving magnet rotated by a driving force of the driving shaft, a driven magnet provided on the conveyer and to which rotation is transmitted from the driving magnet by a magnetic force in a non-contact manner, and an input shaft rotated together with the driven magnet and driving the conveyer are provided; and a plurality of the driven magnet are provided along a moving direction of the conveyer by the moving means, and an interval between the plurality of driven magnets is matched with a moving distance of the conveyer by the moving means.

2. An article conveying device including a conveyer for conveying an article and moving means for moving the conveyer, characterized in that:

driving means for driving the conveyer is provided separately from the conveyer, and a driving shaft rotated by the driving means, a driving magnet rotated by a driving force of the driving shaft, a driven magnet provided on the conveyer and to which rotation is transmitted from the driving magnet by a magnetic force in a non-contact manner, and an input shaft rotated together with the driven magnet and driving the conveyer are provided; and the driving shaft is provided along a moving direction of the conveyer by the moving means, a plurality of the driving magnet are provided along the driving shaft, and an interval between the plurality of driving magnets is matched with a moving distance of the conveyer by the moving means.

3. The article conveying device according to claim 1, wherein the conveyer is disposed inside a work space, the driving means is disposed outside the work space, the driving shaft is provided so as to penetrate an isolating member forming the work space, and the driving magnet and the driven magnet are provided inside the work space.

* * * * *